May 2, 1933. B. E. BALDUF ET AL 1,906,510
APPARATUS FOR THE MANUFACTURE OF BUILDING INSULATION
Original Filed July 1, 1929  3 Sheets-Sheet 1
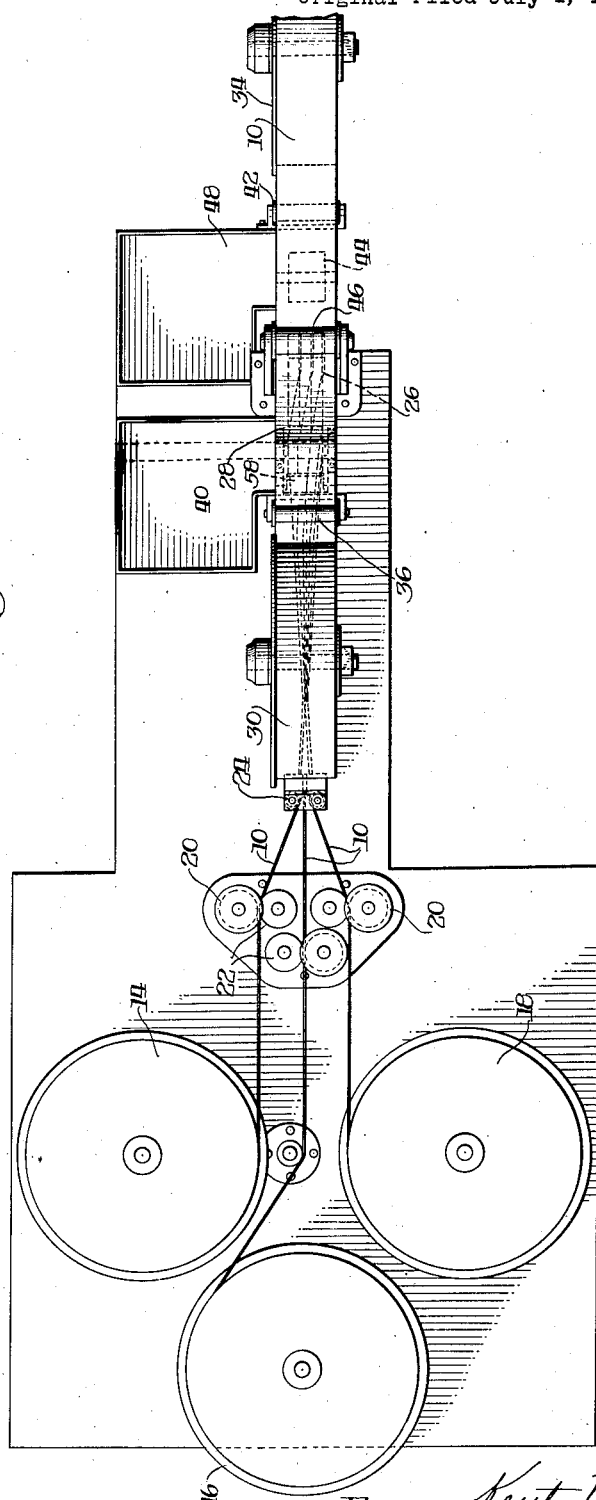
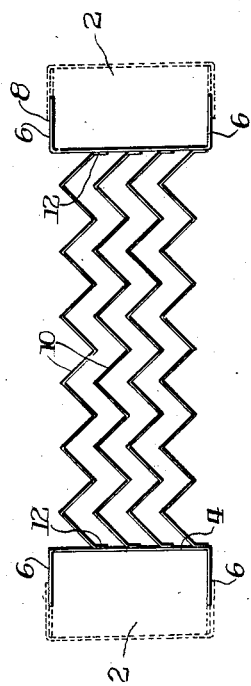
Inventors:
Bruno E. Balduf
Harold O. Hayes.
By Kent W. Wormell Atty.

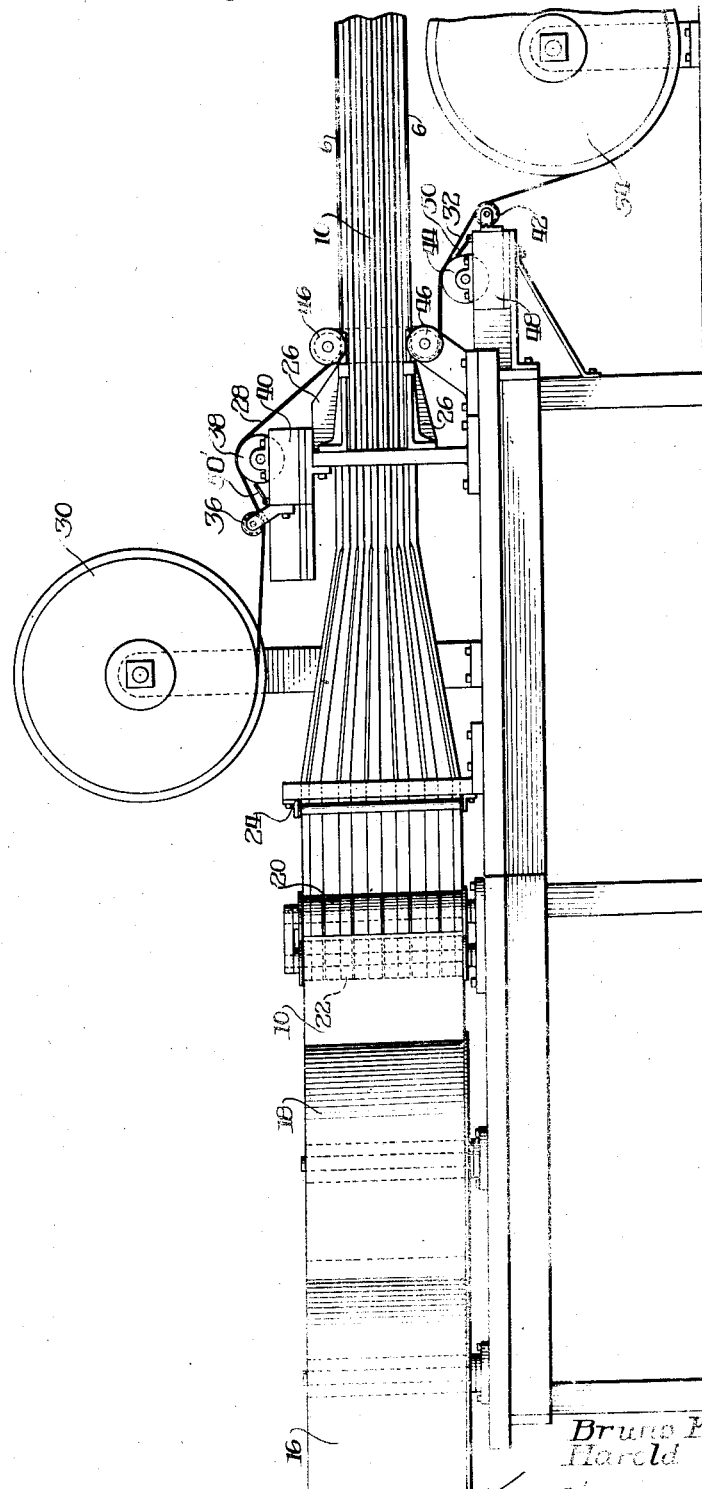

May 2, 1933. B. E. BALDUF ET AL 1,906,510
APPARATUS FOR THE MANUFACTURE OF BUILDING INSULATION
Original Filed July 1, 1929 3 Sheets-Sheet 3
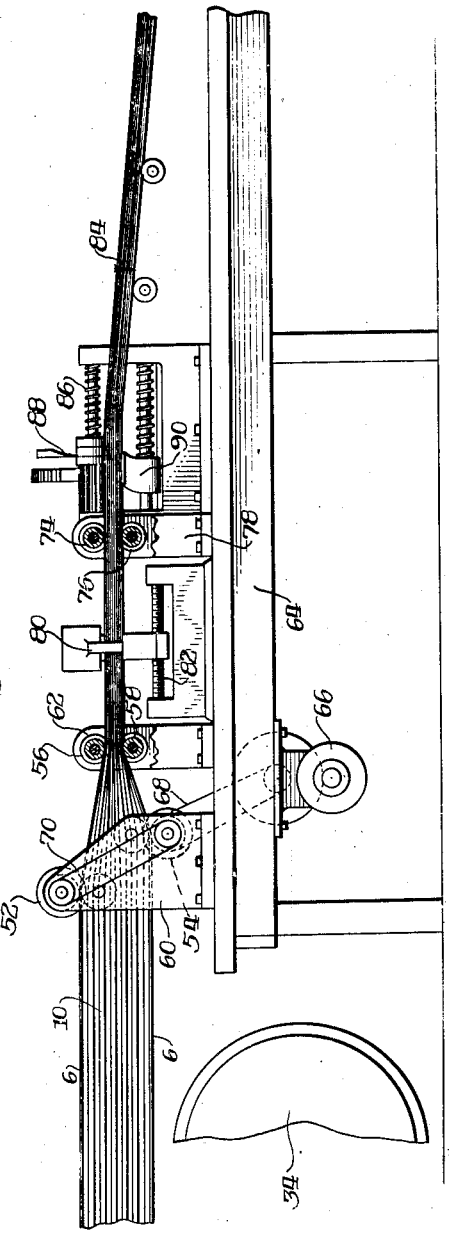
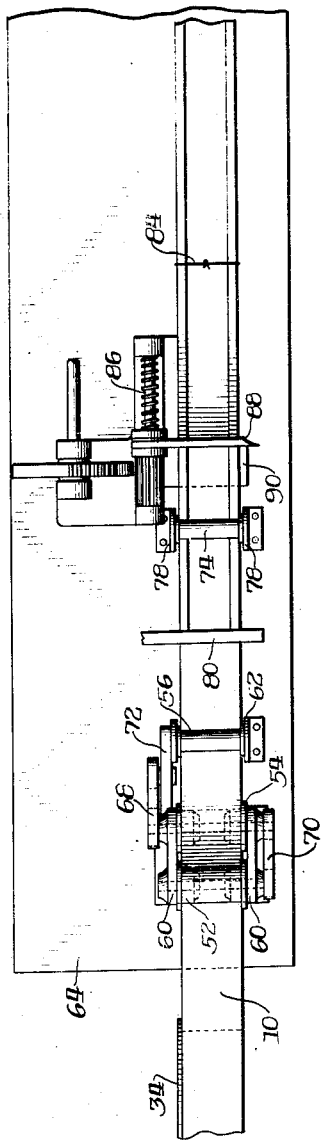
Inventors
Bruno E. Balduf
Harold O. Hayes
By Kent W. Worsell Atty Patented May 2, 1933

1,906,510

UNITED STATES PATENT OFFICE

BRUNO E. BALDUF, OF CHICAGO, AND HAROLD O. HAYES, OF EVANSTON, ILLINOIS, ASSIGNORS TO UNITED STATES GYPSUM COMPANY, OF CHICAGO, ILLINOIS, A CORPORATION OF ILLINOIS

APPARATUS FOR THE MANUFACTURE OF BUILDING INSULATION

Application filed July 1, 1929, Serial No. 375,183. Renewed April 14, 1932.

This invention relates in general to apparatus for making a collapsible or telescoping insulation particularly adapted to be used in buildings. One of the objects of the invention is in the provision of apparatus for making a collapsible, telescopic or folding type of fabric insulation which may be folded or collapsed to occupy a minimum space for storage and shipping but which is collapsible for variable space of building studs or other members to which it is applied.

A further object of the invention is in the provision of a light fabric structure which provides a series of divided air spaces for reducing the transmission of sounds and also for providing an effective insulation against transmission or loss of heat.

A further object of the invention is in the provision of a machine for continuously making an insulation of this kind in strip form and in severing and tying sections of the insulation as they are formed. Other objects of the invention will appear hereinafter, the accompanying drawings illustrating a preferred form of the insulation and a machine for making it.

In the drawings Fig. 1 is a plan view of a machine for making an insulation of the type shown in Fig. 2 in accordance with the principles of this invention; Fig. 2 is a sectional view of the folding or concertina type of insulation made by the machine; Fig. 3 is a side view of the forming portion of the machine shown in Fig. 1; Fig. 4 is a side view of the tying and cut-off portion of the machine; and Fig. 5 is a plan view of that portion of the machine shown in Fig. 4.

In the insulation of buildings for heat and sound it has been found that an air space divided into narrow sections provides a high type of insulation. The present invention comprises an insulation unit formed of a number of fabric sheets, such as paper, felt, cloth, or other membrane folded to fit extensibly between adjacent studding or other supports, thus eliminating all cutting and fitting of the insulation, as the studs or supports of all buildings are spaced variable or unequal distances apart. For example, one insulation unit permits a variable studding spacing of from three to fourteen inches apart and maintains divided air spaces supported by fabric walls which minimize the transference of sound and heat therethrough.

Referring more particularly to Fig. 2 of the drawings, a pair of building studs 2 are spaced apart a variable distance and a strip of unit insulation, comprising end pieces 4 with flaps 6 to overlap the edges of the studs, is applied between them, with the end pieces 4 and flaps 6 cooperating with similar members of the adjacent unit insulation at the other side of the stud to completely enclose each stud. The overlapping flaps 6 are secured in place by tacks 8 or other suitable fastening devices.

Between the end pieces 4 which are insulating material of a semi-rigid nature, such as paper, fabric, or the like, are a number of dividing walls 10 which may be of similar or somewhat lighter fabric sheet material, each sheet being folded oppositely upon itself in a fan fold or concertina type of folding and having edges 12 attached with an adhesive or in any other suitable manner to the end pieces 4.

The dividing walls 10 depend in number and spacing upon the degree of insulation desired, and they consist of materials such as paper or felt fabric folded to collapse upon themselves or to slightly overlap when collapsed; and when entirely folded for storage or shipment, the walls will be packed tightly together without changing the width of the section, as shown in Fig. 2, the flaps 6 being folded inwardly.

These sections when folded occupy a limited space, and the shipping expense for insulation to equip an entire house is very small due to the light weight of the material. This is an important factor in bringing this concertina type of insulation within the reach of those building low cost homes, such as ready-cut houses.

In a frame building, this type of insulation is applied after the frame is complete, and the insulation units are overlapped at the exposed edges of the studs and fastened by tacking, mopping with adhesive or other means. The application of lathing on the inside or sheathing on the outside of the studs additionally fastens the insulation in place. This insulation material is more specifically described and claimed in our co-pending application Serial No. 576,640, filed November 23, 1931, and entitled "Building insulation".

In producing the insulation a plurality of rows of fabric 14, 16 and 18 of which the walls 10 are composed, are mounted upon vertical axes, and the wall material 10 passes between forming rolls 20 and 22 which oppositely crease and fan fold the materials which then pass through a guide 24 which partially folds and collapses the wall webs 10 so that when they reach opposite stationary guides 26 they are partially collapsed and the bent edges 12 at the sides of the wall strips 10 are held in upper and lower planes by guides 26.

In the positions held by the guides 26 which correspond in number with the number of webs or walls 10 of which the insulation is produced, the edges 12 at the top and bottom, as shown in Fig. 3, are in alignment to receive an upper strip 28 which comes from an upper roll 30, and a lower strip 32 which comes from a lower roll 34. The under side of the strip 28 passes under a roller 36 and over an adhesive roller 38 which dips in an adhesive reservoir 40 and then this strip passes under a positioning roller 46 which applies it to the upper edges 12 of the fabric walls 10.

Likewise the lower web 32 passes over a guide roller 42 and then makes contact with an adhesive applying roller 44 and then passes over a guide roller 46 into contact with the lower edges 12 of the wall strips 10. The adhesive roller 44 dips in an adhesive reservoir 48, the thickness of the adhesive being controlled for each of the rollers 38 and 44 by contact plates 50 and 50'. The adhesive employed may be a bituminous cement or any other quick drying adhesive so that upon the passage of the wall webs and the strips 28 and 32 between rollers 46 at one end and between rollers 52 and 54 at the other end, the wall webs 10 have become secured to the strips 28 and 32, and the entire structure may be further compressed between rollers 56 and 58.

These rollers 52 and 54 may be mounted in standards 60, and the rollers 56 and 58 in standards 62 carried by a table or support 64, and these rollers are driven by a motor 66 having driving connections 68, 70 and 72 between the rollers in any well known manner.

After the formed insulation is compressed by rollers 56 and 58 it passes between corresponding rollers 74 and 76 carried by a standard 78 mounted on the table 64 at a distance from the standard 62 with a bundling or tying device 80 disposed between the supports 62 and 78 and movable reciprocably by means of a screw device 82 at the speed of movement of completed insulation to apply a tie 84 about the insulation for holding it in collapsed position.

At the other side of the support 78 is a cut-off device 86 represented more or less diagrammatically in the drawings but comprising a movable knife member 88 and an anvil 90 for supporting the insulation, the knife being periodically operated and moving at the speed of movement of the insulation so that it will cleanly cut off the desired lengths of the formed insulation which has been previously tied by the tying device.

The specific construction of the tying and cut-off devices forms no part of the present invention, any suitable mechanism for accomplishing this result being satisfactory.

With this apparatus the insulation is made quickly, continuously and completely. It is collapsed and ready for shipment or sale when it comes from the machine, cut into suitable lengths. and the cut sections tied so that they will not become loose and disconnected.

In applying the insulation, a full length may be applied between adjacent beams or separate pieces of the insulation may be placed abutting each other to fill the space. We would state in conclusion that, while the illustrated example constitutes a practical embodiment of our invention, we do not wish to limit ourselves precisely to these details, since manifestly, the same may be considerably varied without departing from the spirit of the invention as defined in the appended claims.

Having thus described our invention, we claim as new and desire to secure by Letters Patent:—

1. An apparatus for making and folding building insulation out of sheet material comprising means for feeding said material in substantially parallel strips, folding mechanism for fan-folding the strips, and means for feeding other fabric strips and attaching them to the edges of the fan-folded strips.

2. Apparatus for making folding insulation for building from sheet material, comprising means for feeding a plurality of strips of said material in parallel relation and creasing them to fold oppositely, and means for attaching other strips at the opposite edges of the folded strips and thus producing a multi-wall structure extensible to fit between building studs.

3. In an apparatus for forming building insulation from sheet material, the combination of means for feeding a plurality of strips of sheet material, means for creasing each strip of material to fold lengthwise, means for feeding opposite strips to engage the edges of the folded strips, means for applying an adhesive to the edge strips for securing all of the strips together, and means for tying and cutting the strips in sections.

4. An apparatus for continuously making building insulation of strip sheet material, comprising means for advancing a number of strips of sheet material, means for creasing the strips to fold oppositely, folding mechanism for partially collapsing the creased strips, means for supporting the edges of the strips, means for continuously fitting other strips against the supported edges of the first mentioned strips and applying adhesive thereto so that the folding strips are secured to the other strips at their edges, thus forming a multi-wall insulation between supporting edge pieces.

5. An apparatus for continuously making a building insulation out of strip material, comprising means for feeding a plurality of strips in substantially parallel arrangement, folding mechanism for engaging each of the strips and fan-folding it in the direction of its length, means for partially folding the strips and engaging the upper and lower edges thereof, means for continuously applying upper and lower strips against the supported edges of the fan-folded strips, means for applying an adhesive to the edge strips before they are applied to the edges of the folded strips, and bundling and cut-off mechanism operable intermittently and movable at the same speed with the insulation as the adhesive is drying to tie up and sever the section of the insulation without interrupting the continuous movement thereof.

6. In an apparatus for making and folding building insulation out of sheet material, means for feeding said material in substantially parallel strips, folding means for fan-folding each of said strips, means for feeding other strips of material and attaching said other strip material to the edges of said fan-folded strips, and means for tying and severing the combined strips into short lengths during the continuous movement thereof.

7. In an apparatus for forming building insulation out of sheet material, means for feeding said material in a plurality of adjacent strips, means for fan-folding each of said strips longitudinally, means for feeding other strips of material and attaching said other strip material to the edges of said fan-folded strips, and means for severing the combined strips into short lengths.

BRUNO E. BALDUF.
HAROLD O. HAYES.